(12) United States Patent
Huang

(10) Patent No.: US 10,503,679 B2
(45) Date of Patent: *Dec. 10, 2019

(54) NVM EXPRESS CONTROLLER FOR REMOTE ACCESS OF MEMORY AND I/O OVER ETHERNET-TYPE NETWORKS

(71) Applicant: CNEX Labs, Inc., San Jose, CA (US)

(72) Inventor: Yiren Ronnie Huang, San Jose, CA (US)

(73) Assignee: CNEX LABS, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/242,299

(22) Filed: Aug. 19, 2016

(65) Prior Publication Data

US 2016/0357698 A1    Dec. 8, 2016

Related U.S. Application Data

(63) Continuation of application No. 14/191,335, filed on Feb. 26, 2014, now Pat. No. 9,430,412.
(Continued)

(51) Int. Cl.
*G06F 11/34* (2006.01)
*G06F 12/0831* (2016.01)
(Continued)

(52) U.S. Cl.
CPC ........ *G06F 13/4068* (2013.01); *G06F 11/201* (2013.01); *G06F 11/3027* (2013.01);
(Continued)

(58) Field of Classification Search
CPC ............... G06F 13/4068; G06F 13/42; G06F 15/17337; G06F 13/4221; G06F 13/161;
(Continued)

(56) References Cited

U.S. PATENT DOCUMENTS 5,862,128 A   1/1999  Cooperman et al.
6,021,047 A   2/2000  Lopez et al.
(Continued)

FOREIGN PATENT DOCUMENTS

CN        101622606       1/2010
WO      WO 2008070172     7/2008

OTHER PUBLICATIONS

Kozierok, Charles M., "TCP/IP Guide;" Oct. 4, 2005, http://techbus.safaribooksonline.com/book/networking/tcp-ip/9781593270476.*
(Continued)

*Primary Examiner* — Ninos Donabed
(74) *Attorney, Agent, or Firm* — Fenwick & West LLP

(57) ABSTRACT

A method and system for enabling Non-Volatile Memory express (NVMe) for accessing remote solid state drives (SSDs) (or other types of remote non-volatile memory) over the Ethernet or other networks. An extended NVMe controller is provided for enabling CPU to access remote non-volatile memory using NVMe protocol. The extended NVMe controller is implemented on one server for communication with other servers or non-volatile memory via Ethernet switch. The NVMe protocol is used over the Ethernet or similar networks by modifying it to provide a special NVM-over-Ethernet frame.

18 Claims, 16 Drawing Sheets

Related U.S. Application Data

(60) Provisional application No. 61/839,389, filed on Jun. 26, 2013.

(51) Int. Cl.

| | | |
|---|---|---|
| *G06F 13/16* | (2006.01) | |
| *G06F 13/42* | (2006.01) | |
| *G06F 15/173* | (2006.01) | |
| *H04L 29/12* | (2006.01) | |
| *G06F 13/40* | (2006.01) | |
| *G06F 11/20* | (2006.01) | |
| *G06F 11/30* | (2006.01) | |
| *H04L 29/08* | (2006.01) | |
| *G06F 13/00* | (2006.01) | |
| *H04L 12/40* | (2006.01) | |
| *G06F 16/10* | (2019.01) | |

(52) U.S. Cl.
CPC ........ *G06F 11/349* (2013.01); *G06F 12/0835* (2013.01); *G06F 13/00* (2013.01); *G06F 13/161* (2013.01); *G06F 13/1684* (2013.01); *G06F 13/42* (2013.01); *G06F 13/4221* (2013.01); *G06F 15/17337* (2013.01); *H04L 61/1582* (2013.01); *H04L 61/6022* (2013.01); *H04L 67/1097* (2013.01); *G06F 16/10* (2019.01); *G06F 2213/0026* (2013.01); *H04L 12/40176* (2013.01)

(58) Field of Classification Search
CPC .............. G06F 13/1684; G06F 12/0835; G06F 11/349; G06F 11/201; G06F 11/3027; G06F 13/00; G06F 2213/0026; G06F 17/30067; G06F 3/0688; G06F 3/061; G06F 3/0659; H04L 61/1582; H04L 67/1097; H04L 61/6022; H04L 12/40176; H04L 67/1004; Y02B 60/35
See application file for complete search history.

(56) References Cited

U.S. PATENT DOCUMENTS

| | | | |
|---|---|---|---|
| 6,400,730 | B1 | 6/2002 | Latif et al. |
| 6,442,634 | B2 | 8/2002 | Bronson et al. |
| 6,834,326 | B1 | 12/2004 | Wang et al. |
| 6,950,895 | B2 | 9/2005 | Bottom |
| 6,958,916 | B2 | 10/2005 | Roesner et al. |
| 6,981,070 | B1 | 12/2005 | Luk et al. |
| 7,236,459 | B1 | 6/2007 | Okholm et al. |
| 7,386,610 | B1 | 6/2008 | Vekiarides |
| 7,519,769 | B1 | 4/2009 | Kulkarni et al. |
| 8,078,622 | B2 | 12/2011 | Rabii et al. |
| 8,086,791 | B2 | 12/2011 | Caulkins |
| 8,175,094 | B2 | 5/2012 | Bauchot et al. |
| 8,595,385 | B1 | 11/2013 | Shapiro et al. |
| 9,189,172 | B1 * | 11/2015 | McLeran ................ G06F 3/061 |
| 9,430,412 | B2 | 8/2016 | Huang |
| 2002/0071386 | A1 | 6/2002 | Gronke |
| 2005/0220020 | A1 | 10/2005 | Qureshi et al. |
| 2006/0013128 | A1 | 1/2006 | Connor et al. |
| 2006/0047907 | A1 | 3/2006 | Shiga et al. |
| 2006/0161706 | A1 | 7/2006 | Iyer et al. |
| 2006/0286993 | A1 | 12/2006 | Xie et al. |
| 2007/0153697 | A1 | 7/2007 | Kwan et al. |
| 2007/0234130 | A1 | 10/2007 | Sullivan et al. |
| 2008/0056300 | A1 | 3/2008 | Williams |
| 2008/0065747 | A1 | 3/2008 | Kubota |
| 2008/0120487 | A1 * | 5/2008 | Saripalli ............. G06F 12/1081 711/206 |
| 2008/0140932 | A1 | 6/2008 | Flynn et al. |
| 2008/0285346 | A1 | 11/2008 | Han et al. |
| 2009/0197683 | A1 | 8/2009 | Svennebring et al. |
| 2010/0114889 | A1 | 5/2010 | Rabii et al. |
| 2010/0153672 | A1 | 6/2010 | Jogand-Coulomb et al. |
| 2010/0257281 | A1 | 10/2010 | Patel et al. |
| 2011/0138136 | A1 | 6/2011 | Shitomi et al. |
| 2011/0222413 | A1 | 9/2011 | Shukla et al. |
| 2011/0258488 | A1 | 10/2011 | Nightingale et al. |
| 2012/0014386 | A1 | 1/2012 | Xiong et al. |
| 2012/0023207 | A1 | 1/2012 | Gandhewar et al. |
| 2012/0191665 | A1 | 7/2012 | Floyd et al. |
| 2012/0243589 | A1 | 9/2012 | Desjardins |
| 2012/0254484 | A1 | 10/2012 | Yang et al. |
| 2013/0007352 | A1 | 1/2013 | Maislos et al. |
| 2013/0067062 | A1 | 3/2013 | Gaitonde et al. |
| 2013/0086311 | A1 | 4/2013 | Huang et al. |
| 2013/0103787 | A1 * | 4/2013 | Glover ................ H04L 67/1002 709/217 |
| 2013/0013643 | A1 | 5/2013 | Kaplan et al. |
| 2013/0108263 | A1 | 5/2013 | Srinivas et al. |
| 2013/0135816 | A1 | 5/2013 | Huang |
| 2013/0163175 | A1 | 6/2013 | Kim et al. |
| 2013/0191590 | A1 * | 7/2013 | Malwankar ........... G06F 3/0611 711/114 |
| 2013/0198311 | A1 | 8/2013 | Tamir et al. |
| 2014/0002988 | A1 | 1/2014 | Roesner et al. |
| 2014/0032959 | A1 * | 1/2014 | Dawkins ............. G06F 11/2048 714/6.3 |
| 2014/0089553 | A1 | 3/2014 | Ma |
| 2014/0195634 | A1 | 7/2014 | Kishore et al. |
| 2014/0250073 | A1 * | 9/2014 | Zalpuri ............ G06F 17/30174 707/636 |
| 2014/0281040 | A1 * | 9/2014 | Liu .......................... G06F 9/50 710/3 |
| 2014/0281123 | A1 | 9/2014 | Weber |
| 2014/0317206 | A1 * | 10/2014 | Lomelino ........... H04L 67/1097 709/206 |
| 2014/0372675 | A1 | 12/2014 | Higeta et al. |
| 2015/0006663 | A1 | 1/2015 | Huang |
| 2015/0012735 | A1 | 1/2015 | Tamir et al. |
| 2015/0032936 | A1 * | 1/2015 | Yu ....................... G06F 12/0246 711/103 |
| 2015/0055508 | A1 | 2/2015 | Ashida et al. |
| 2015/0134857 | A1 * | 5/2015 | Hahn ..................... G06F 3/061 710/5 |
| 2015/0186074 | A1 * | 7/2015 | Benisty ................ G06F 3/0659 711/115 |
| 2015/0222705 | A1 | 8/2015 | Stephens |
| 2015/0261720 | A1 | 9/2015 | Kagan et al. |
| 2015/0304422 | A1 * | 10/2015 | Shapiro ................ G06F 3/0641 709/217 |
| 2015/0304423 | A1 | 10/2015 | Satoyama et al. |
| 2015/0370668 | A1 | 12/2015 | Nazari et al. |
| 2015/0372867 | A1 | 12/2015 | Amann et al. |
| 2016/0117227 | A1 | 4/2016 | Hetrick et al. |
| 2016/0127468 | A1 | 5/2016 | Malwankar et al. |
| 2016/0127492 | A1 | 5/2016 | Malwankar et al. |
| 2016/0127509 | A1 | 5/2016 | Uriel |
| 2016/0162438 | A1 | 6/2016 | Hussain et al. |

OTHER PUBLICATIONS

NVM Express Management Interface "NVM Express Management Interface," Revision 1.0, Nov. 17, 2015, 96 Pages, Can be retrieved at <URL:http://www.nvmexpress.org/wp-content/uploads/NVM Express_Management_Interface1_O_gold.pdf>.

Hedlund, B., "Top of Rack vs End of Row Data Center Designs," Apr. 5, 2009, 15 Pages, Can be retrieved at URL:http://bradhedlund.com/2009/04/05/top-of-rack-vs-end-of-row-data-center-designs/>.

Office Action for U.S. Appl. No. 14/954,691, dated Jan. 20, 2017, 99 Pages.

PCT International Search Report and Written Opinion for PCT/US16/49759, dated Jan. 19, 2017, 16 Pages.

Intel "Intel Core 2 Quad Processor" Product Brief, Jan. 15, 2007, 2 Pages, Can be retrieved at <URL:http://web.archive.org/web/20070115184018/http://www.intel.com/products/processor/core2quad/prod _brief. pdf>.

Intel, "Intel 10 Gigabit AF DA Dual Port Server Adapter," Product Brief, Sep. 25, 2007, 4 Pages, Can be retrieved at <URL:http://web.

(56) References Cited

OTHER PUBLICATIONS archive.org/web/20110925095033/http://www.dell.com/downloads/global/products/pwcnt/en/intel_10_gig_afda_dual_port_prodbrief.pdf>.

Kessler, G., "Binary Numbers and Subnet Masks," Oct. 2000, 4 Pages, Can be retrieved at <URL:http://www.garykessler.net/library/subnet_masks.html, Oct. 2000>.

Kozierok, C., "The TCP/IP guide: a comprehensive, illustrated Internet protocols reference," No Starch Press, Oct. 4, 2005, 30 Pages, Safari Books.

Cisco, "Deploying IIPv6 in Unified Communications Network with Cisco Unified Communications Manager 8.0(x)", IPv6 Basics, Chapter 2, Jun. 8, 2010, 10 Pages, Can be retrieved at <URL:http://www.cisco.com/c/en/us/td/docs/voice_ip_comm/cucm/srnd/ipv6/ipv6srnd/basics.pdf>.

Cobb, D., "Nvm express and the pci express* ssd revolution," Intel Developer Forum, 2012, 48 Pages.

Walker, D., "A Comparison of NVMe and AHCI," NVM Express, Jul. 31, 2012, 40 Pages, Can be retrieved on the internet <URL:https://sata-io.org/system/files/memberdownloads/NVMe%20and%20AHCl_%20 long_. pdf>.

PCT International Search Report and Written Opinion for PCT/US14/43279, dated Oct. 29, 2014, 15 Pages.

Wikipedia, "NVM Express," Last Modified Jun. 9, 2015, 5 Pages, [online] [retrieved on Jun. 18, 2015] Retrieved from the Internet <URL:https://en.wikipedia.org/wiki/NVM.sub.--Express>.

Office Action and Search Report for Taiwanese Patent Application No. TW 103122146, dated Feb. 17, 2016, 14 Pages.

Office Action for U.S. Appl. No. 14/191,335, dated Jan. 8, 2016, 148 Pages.

Office Action for U.S. Appl. No. 14/843,892, dated Oct. 6, 2016, 101 Pages.

Office Action for U.S. Appl. No. 14/843,891, dated Sep. 15, 2016, 129 Pages.

Office Action for U.S. Appl. No. 14/843,884, dated Aug. 25, 2016, 117 Pages.

"How the Computer Works: The CPU and Memory" Dec. 15, 2003, 7 Pages, Can be retrieved on the internet <URL:2003http://web.archive.org/web/20031215230244/http://homepage.cs.uri.edu/faculty/wolfe/b00k/Readings/Reading04.htm>.

"NVM Express Organization Initiates "NVM Express over Fabrics" Effort; NVMe Specification Revision 1.2 Approaching Ratification;" Sep. 3, 2014, 3 pages, Can be retrieved on the internet <URL:http://www.nvmexpress.org/wp-content/uploads/NVM_Express_oF-1_2_Press_Release.pdf>.

"NVM Express Explained." Aug. 22, 2016, 5 Pages, Archived on web.archive.org, Can be retrieved on the Internet <URL: Http://web.archive.org/web/20130822213348/http://www.nvmexpress.org/wpcontent/uploads/2013/04/NVM_whitepaper.pdf>.

Pillial, S., "How does Indexing Makes Database Faster;" Apr. 13, 2013, 11 Pages, Can be retrieved on the Internet <URL:http://www.slashroot.in/how-does-indexing-makes-database-faster>.

PCT Invitation to Pay Additional Fees and, where Applicable, Protest Fee, PCT/US16/49759, Nov. 3, 2016, 2 Pages.

First Office Action for Chinese Patent Application No. CN 2014800429208, dated Feb. 27, 2018, 9 Pages (With English Translation).

BuildVirtual, "Using ESXCLI to Troubleshoot iSCSI Related Issues," Jul. 13, 2014, 3 Pages, Can be retrieved at <URL:https://web.archive.org/web/20140713023905/http://buildvirtual.net/using-esxcli-to-troubleshoot-iscsi-related-issues/>.

Ross, B., "Storage over the Internet—iSCSI emerges," It World, Network World, Apr. 5, 2011, 4 Pages, Can be retrieved at <URL:https://www.itworld.com/article/2797004/storage/storage-over-the-internet----iscsi-emerges. html>.

United States Office Action, U.S. Appl. No. 14/954,691, dated Apr. 27, 2018, 10 pages.

* cited by examiner

200

1100

1150

1200

1250

NVM EXPRESS CONTROLLER FOR REMOTE ACCESS OF MEMORY AND I/O OVER ETHERNET-TYPE NETWORKS

CROSS-REFERENCE TO RELATED APPLICATION(S)

This application is a continuation of U.S. patent application Ser. No. 14/191,335, "NVM Express Controller for Remote Access of Memory and I/O Over Ethernet-Type Networks," filed on Feb. 26, 2014; which claims priority under 35 U.S.C. § 119(e) to U.S. Provisional Patent Application Ser. No. 61/839,389, "NVM EXPRESS CONTROLLER FOR REMOTE ACCESS OF MEMORY OVER ETHERNET-TYPE NETWORKS," filed Jun. 26, 2013. The subject matter of all of the foregoing is incorporated herein by reference in its entirety.

BACKGROUND OF THE INVENTION

1. Field of the Invention

This invention generally relates to accessing remote memory with low latency by using the Non-Volatile Memory Express (NVMe) protocol over a network.

2. Description of the Related Art

Typically, a CPU can access remote memory or I/O devices over a network by using network protocols. One conventional approach to access remote memory or I/O devices is through iSCSI storage. This approach uses significant processing by the CPU, which increases total access latency. Accessing remote memory or I/O devices via iSCSI storage usually has latency four to five times greater than a direct access of local memory or I/O devices. This leads to noticeable performance and throughput degradation for systems requiring remote memory or I/O devices access over a network.

A relatively new interface standard that deals with local non-volatile memory access is NVM Express (NVMe), sometimes referred to as the Non-Volatile Memory Host Controller Interface Specification. NVMe is a register-level interface that allows host software to communicate with a non-volatile memory subsystem. This interface is optimized for enterprise and client solid state drives (SSDs), which is typically attached to the PCI Express (PCIe) interface. NVMe provides a direct I/O access to local non-volatile memory. Using NVMe, the latency of read and write operations is reduced, compared with connecting over traditional I/O interfaces, such as SAS (Serial SCSI) or SATA (Serial ATA).

However, NVMe has a limitation pertaining to passing of data over Ethernet switches or other types of networks. Generally, NVMe is designed to access local SSDs and is not defined in terms of accessing remote storage through a network. NVMe as defined today does not provide solutions for accessing multiple remote SSDs by multiple host CPUs through a network. Accordingly, there is a need to enable NVMe to work efficiently over a network (e.g., Ethernet network) for accessing remote SSDs and name spaces over the network.

SUMMARY

The present invention overcomes the limitations of the prior art by providing a system that enables the access of remote non-volatile memory over an external network (such as Ethernet) using NVMe commands. In one aspect, an extended NVMe controller provides this capability.

In one approach, an extended NVMe controller enables a CPU to access remote non-volatile memory (e.g., SSDs) using the NVMe protocol. For example, the extended NVMe controller is implemented on one server for communication with other servers or SSDs via an Ethernet switch. The NVMe protocol can be used over Ethernet by providing an NVM-over-Ethernet (NVMoE) frame. In one implementation, an NVMoE frame is defined specifying an NVMoE command transmitted by the extended NVMe controller over the Ethernet network. The extended NVMe controller includes a conversion mechanism for converting an NVMe command to an NVMoE command based on the definition of the NVMoE frame. Specifically, the conversion mechanism is supported by a mapping table for mapping host identifier (HSID) of NVMe controller and/or namespace identifier (NSID) of the NVMe command to Ethernet media access control (MAC) addresses included in the NVMoE command.

In another aspect, the extended NVMe controller is equipped with a retry mechanism for recovering from loss of NVMe commands transmitted over the external network. The retry mechanism includes a timer for detecting a loss of an NVMe command and if the NVMe command is determined to be lost according to the timer, the retry mechanism will reissue the NVMe command.

In yet another aspect, the extended NVMe controller enables multi-path I/O and namespace sharing. Multi-path I/O refers to two or more completely independent physical PCIe paths between a single host and a namespace. Namespace sharing refers to the ability for two or more hosts to access a common shared namespace using different NVMe controllers. One or more of the extended NVMe controllers can enable a host to access a single namespace through multiple PCIe paths and two or more hosts to access a shared namespace.

Another aspect of the invention includes an extended NVMe storage network including multiple local NVMe storage nodes and an external network coupling the multiple NVMe storage nodes. The local NVMe storage nodes include one or more host processors, the extended NVMe controllers as described above and local non-volatile memories.

In one exemplary embodiment, the external network can include an L3 network. Accordingly, the extended NVMe controllers can include command translators for translating the NVMe commands to NVMoE commands encapsulated by L3 packet headers and thus suitable for transmission over the L3 network.

Various example applications of the extended NVMe storage network are also described herein to suit different scenarios. In one application, the extended NVMe storage network is implemented as a server rack, where the local storage nodes include servers in the server rack and external network includes a top of rack Ethernet switch. In another application, the extended NVMe storage network is implemented as a single server including a single host, where each local NVMe storage node includes a dedicated extended NVMe controller and a dedicated local non-volatile memory based name space. In yet another example application, the extended NVMe storage network includes at least two host processors and provides redundancy via the two extended NVMe controllers.

Other aspects of the invention include methods, systems, components, devices, improvements, applications and other aspects related to those described above.

Additional features and advantages of the invention will be set forth in the description that follows, and in part will be apparent from the description, or may be learned by practice of the invention. Various advantages of the invention may be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Typically, an NVMe controller is associated with a single PCI Function. The capabilities that a controller supports are indicated in the Controller Capabilities (CAP) register and as part of the controller and namespace data structures returned by an identify command. The controller data structure indicates capabilities and settings that apply to the entire controller. The namespace data structure indicates capabilities and settings that are specific to a particular namespace. In addition, the NVMe controller is based on a paired submission and completion queue mechanism. Commands are placed by the host software into a submission queue. Completions are placed into the associated completion queue by the controller. Multiple submission queues may utilize the same completion queue. The submission and completion queues are allocated in host memory.

The present invention is directed to a method for enabling access to remote non-volatile memory (e.g., SSD) name spaces over a network using NVMe protocol, to reduce access latency. Accordingly, an extended NVMe controller enables the host CPU to access remote non-volatile memory using NVMe protocol. The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
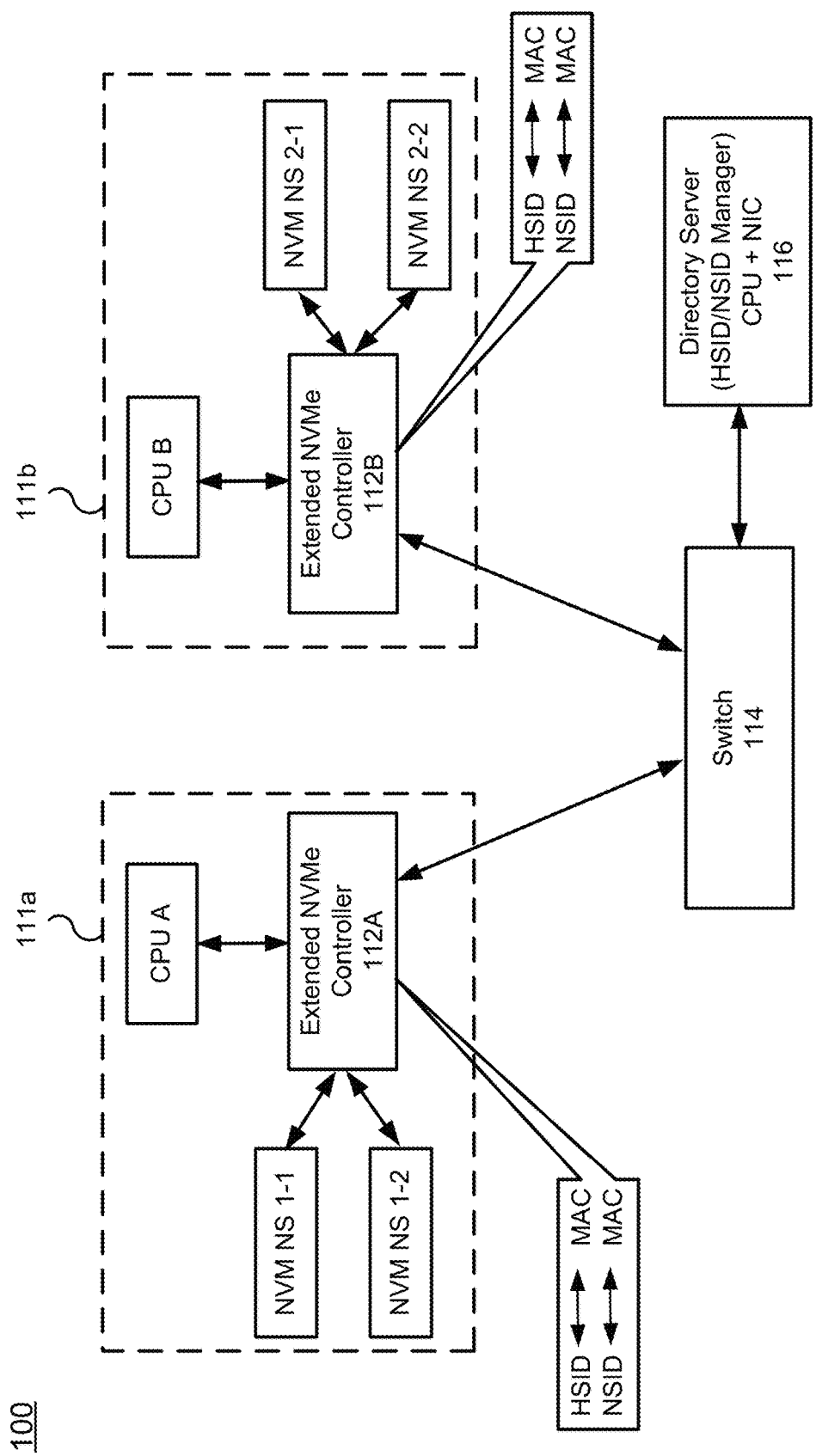
FIG. 1 is a block diagram of a system illustrating an extended NVMe storage network.

Referring now to FIG. 1, a block diagram of a system 100 illustrating an extended NVMe storage network is depicted according to one exemplary embodiment. The extended NVMe storage network 100 can be one example of an NVMe over Ethernet architecture. In the illustrated exemplary embodiment, the extended NVMe storage network 100 includes two local NVMe storage nodes 111a, 111b and an external network (including a switch 114) coupling the two local NVMe storage nodes 111a, 111b. The extended NVMe storage network 100 also includes a directory server 116 communicatively coupled to the external network that includes the switch 114. In one embodiment, the external network is an Ethernet network. In other embodiments, the external network can be fibre channel (FC) or InfiniBand (IB) type of network.

The two local NVMe storage nodes 111a, 111b each include a host processor (e.g., CPU A, or CPU B), an extended NVMe controller 112A, 112B, and local non-volatile memories represented by NVMe namespaces (e.g., NVM NS 1-1 and NVM NS 1-2, or NVM NS 2-1 and NVM NS 2-2). In one embodiment, the non-volatile memory is a solid-state drive (SSD). In another embodiment, the non-volatile memory is a hard disk drive. The extended NVMe controllers 112A, 112B are coupled to the CPUs, e.g., CPU A, CPU B, respectively via their own host interfaces. For example, the host interface included in an extended NVMe controller 112A, 112B may be a PCI Express (PCIe) interface. In addition, the extended NVMe controllers 112A, 112B include their respective direct network interfaces to couple them to the external network (including the switch 114). For example, for coupling the extended NVMe controllers 112A, 112B to an Ethernet network, the direct network interfaces can be Ethernet MAC interfaces. Furthermore, the extended NVMe controllers 112A, 112B are each coupled to their local NVMe namespaces for local non-volatile memories via one or more local storage interfaces. For example, the extended NVMe controller 112A is coupled to its local NVMe namespaces (e.g., NVM NS 1-1 and NVM NS 1-2) via a local storage interface. Similarly, the extended NVMe controller 112B is coupled to its local NVMe namespaces (e.g., NVM NS 2-1 and NVM NS 2-2) via another local storage interface included in the controller 112B.

Within the nodes 111a, 111b, respectively, the extended NVMe controllers 112A, 112B receive from their host CPUs (e.g., CPU A, CPU B) NVMe commands directed to their local NVMe namespaces (e.g., NVM NS 1-1 and NVM NS 1-2, or NVM NS 2-1 and NVM NS 2-2) and provide the CPUs the I/O access to their local namespaces. For example, the extended controller 112A may receive NVMe commands from the CPU A for accessing the local namespaces NVM NS 1-1 and NVM NS 1-2. Since the NVMe controllers 112A, 112B have a clear definition for the addresses of their local namespaces, the NVMe controller 112A, 112B can process the commands accordingly.

In one embodiment, the extended NVMe controller 112A, 112B (also referred to individually or collectively as 112) may receive from its host CPU (e.g., CPU A or CPU B) NVMe commands directed to a remote namespace for remote non-volatile memories coupled to the external network. For example, the extended NVMe controller 112A may receive from the CPU A an NVMe command directed to the NVM NS 2-1 or NVM NS 2-2 coupled to the external network. This occurs when, for example, the CPU A in node 111a desires to read/write data from/to the remote namespace NVM NS 2-1 or NVM NS 2-2 in node 111b. According to the illustrated exemplary embodiment in FIG. 1, the extended NVMe controller 112 can apply an NVMe over Ethernet (NVMoE) protocol to transmit the NVMe command over the external network switch (e.g., a Converged Enhanced Ethernet Switch or even the traditional Ethernet Switch). Such a new protocol beneficially allows a CPU to use the NVMe protocol to access a name space attached to a different extended NVMe controller or to call a remote namespace. This further enables the CPU to access to a remote namespace with only the local access latency.

To achieve this, the extended NVMe controller 112 converts the NVMe commands directed to a remote namespace into a format suitable for transmission over the external network so that the commands can be transmitted to another extended NVMe controller 112 locally coupled (such as coupled via a local storage interface) to the remote namespace. Typically, an NVMe controller has a 64-bit host identifier (HSID) and an NVMe namespace has a 32-bit namespace identifier (NSID). The HSID is configurable through NVMe controller registers. The NSID is a continuous sequence of namespaces 1–n, where n is the total number of available namespaces. In one exemplary embodiment, the extended NVMe controller 112 may convert an NVMe command to a suitable format for transmission over Ethernet by utilizing a mechanism for mapping the HSID and NSID in the NVMe command to Ethernet MAC addresses used for transmission over Ethernet. A definition of the format for the NVMe commands suitable for transmission over Ethernet is illustrated in FIG. 2.

Figure 2:
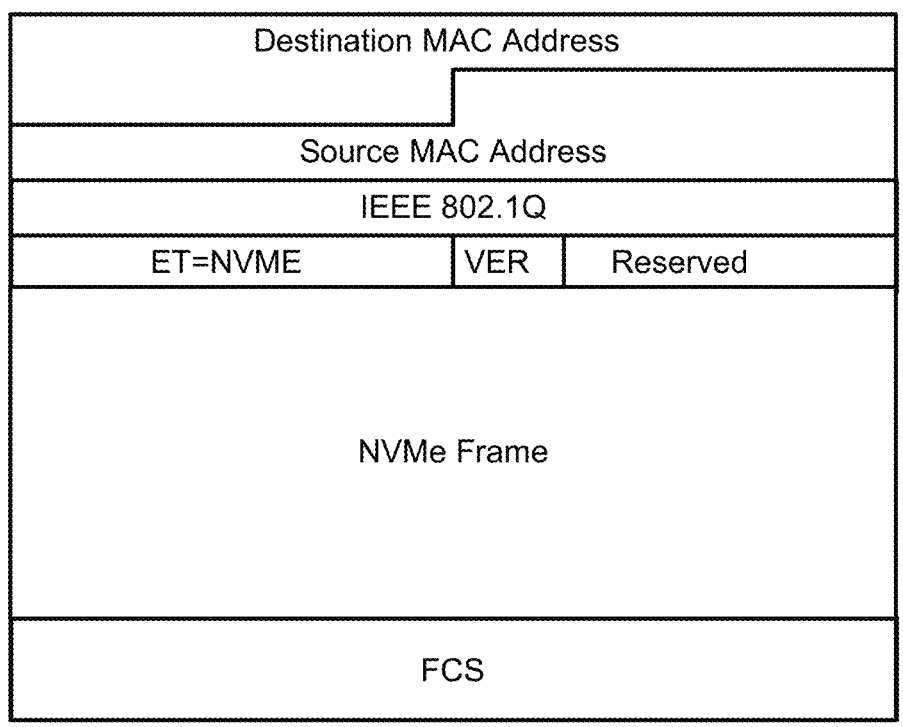
FIG. 2 is a diagram of an NVMoE frame definition.

Accordingly, FIG. 2 illustrates a definition for NVMe over Ethernet (NVMoE) frame structure 200, in accordance with one exemplary embodiment. The NVMe over Ethernet (NVMoE) frame 200 includes a destination MAC address (e.g., a 48-bit destination MAC address). Among all bits of the MAC address, the 24 most significant bits construct the Organizationally Unique Identifier (OUI). The NVMoE frame also includes a source MAC address (e.g., a 48-bit source MAC address); an IEEE 802.1Q tag such as a virtual local area networks (VLAN)/quality of service (QoS) 1Q tag; a type code "ET"; and a version number "VER" (e.g., a 4-bit version number). The type code "ET" can be used to indicate that this is an NVMe-over-Ethernet type of frame. In addition, the NVMoE frame 200 includes an NVMe frame defining the Admin and I/O command, and a frame check sequence (FCS) (e.g., a 32-bit frame checksum for the entire NVMoE frame). In this example, there is no separate cyclic redundancy check (CRC) for the NVMe frame. In one embodiment, the extended NVMe controller 112 can use an NVMoE frame, such as the frame 200 shown in FIG. 2, to specify an NVMe command in a format suitable for transmission over Ethernet.

Referring back to FIG. 1, also illustrated is an HSID and NSID assignment mechanism in accordance with the exemplary embodiment. In the NVMe over Ethernet protocol, an HSID includes 64 bits configured by the CPU. When the CPU, which has the extended NVMe controller 112 attached, sends a command to a remote NVMe namespace, it communicates with the directory server 116. In one exemplary embodiment, the directory server 116 may be a software-defined storage (SDS) controller. In practice, the SDS controller 116 can reside on the same CPU that manages the network switch 114. However, it can also be implemented on a separate CPU from the one managing the switch 114. The SDS controller 116 has a directory that manages all the HSIDs and NSIDs of the NVMe storage nodes 111a, 111b (also referred to individually or collectively as 111) within the entire extended NVMe storage network 100 so that there are no repetitions of the assigned HSIDs as well as the assigned NSIDs. For example, for different local NVMe storage nodes 111, the SDS controller 116 assigns different HSIDs to different CPUs and different NSIDs to different namespaces. Therefore, each namespace in a storage node 111 has unique HSID and NSID. For different CPUs such as CPU A and CPU B, the NSIDs of the same namespace can be different, while in the upper layer application, the namespace is understood as the same logical namespace despite its different namespace IDs.

Figure 3:
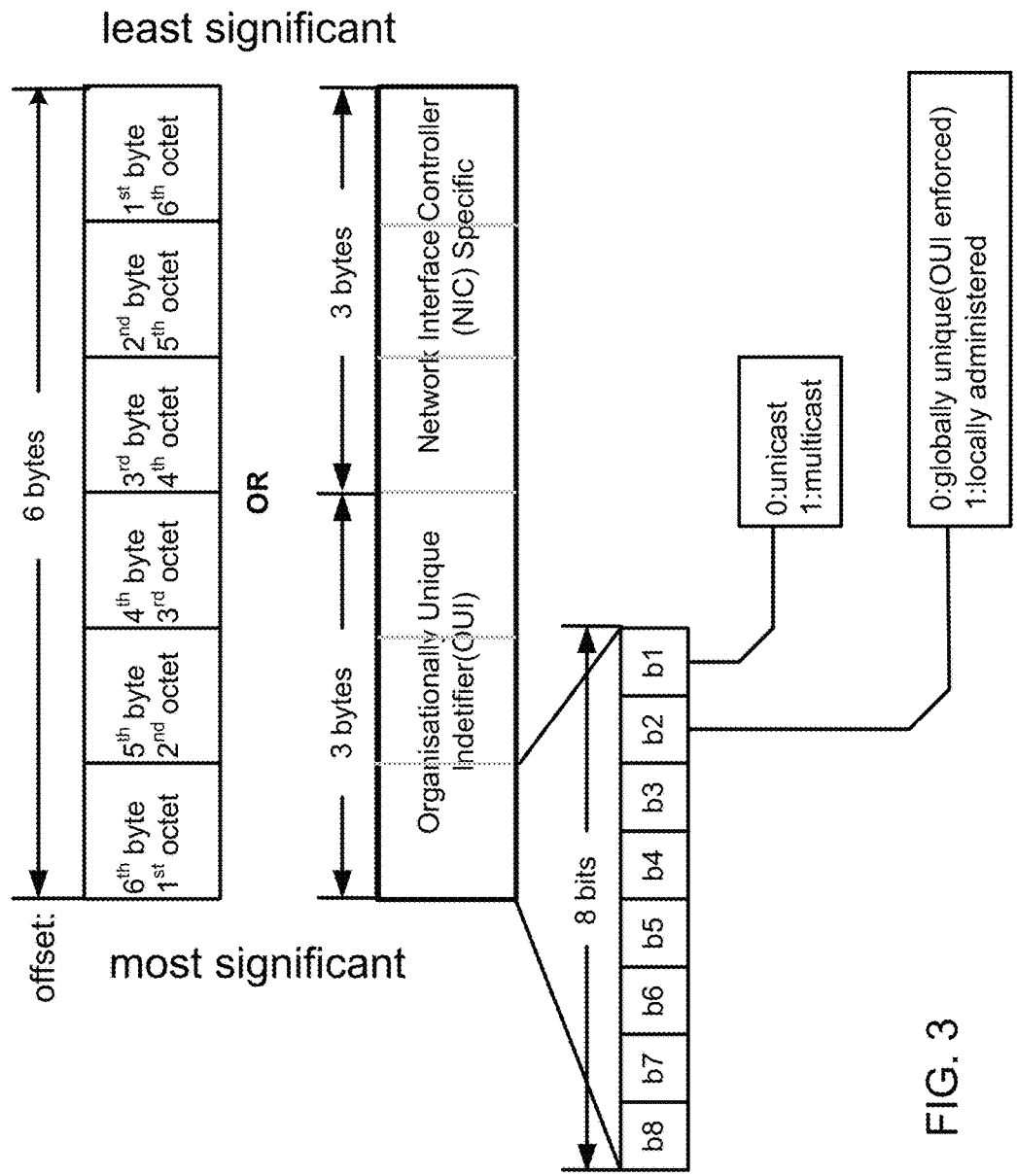
FIG. 3 is a diagram of a first portion of the NVMoE frame definition, as depicted in FIG. 2.

FIG. 1 also illustrates an NVMe to Ethernet mapping table in accordance to the exemplary embodiment. Once the HSIDs and the NSIDs are assigned, in order to transmit and receive NVMe commands and data through the Ethernet switch 114, the extended NVMe storage network 100 maps HSID of an extended NVMe controller and NSID of an NVMe namespace to MAC addresses. FIG. 3 illustrates a structure for 48-bit MAC addresses. Accordingly, for mapping the 64-bit HSID to the 48-bit MAC address, a 64-bit to 48-bit mapping is used. The extended NVMe controller 112 uses the OUI for the most significant 24 bits of the MAC address and uses the assigned HSID [23:0] as the starting address to fill out the network interface controller (NIC) specific lower 24 bits of the MAC address. Other mappings are possible if more than the lower 24 bits of the HSID are desired.

For NSID to MAC address mapping, a 32-bit to 48-bit mapping is used. The extended NVMe controller 112 uses the above HSID mapped MAC address and local NSID as the name space MAC address. That is, the upper 24 bits of the MAC address are the OUI; the lower 24 bits are used for the NSID specific value. (Again, other mappings are possible if more than the lower 24 bits of the NSID are desired.) In this way, the MAC addresses used by the extended NVMe controller can be contiguous and easy to manage. One extended NVMe controller card uses 1+n addresses in the MAC address space, where the 1 address is used for the HSID and the n addresses are used for the NSID namespaces used by the namespace controllers. NSIDs for other extended NVMe controller are mapped based on their OUIs and starting NIC IDs. In one embodiment, the SDS controller of the directory server 116 can handle and manage the mapping of the HSID and NSID to the MAC addresses. In other exemplary embodiment, the extended NVMe controller 112 can handle the mapping of the HSID and NSID to the MAC addresses by maintaining a mapping table for mapping the HSID and NSID to the MAC addresses.

In one embodiment, this mapping makes it possible to use the L2 learning mechanism, since the embodiment uses the Ethernet MAC address to identify the HSID and NSID. Thus, the behavior of L2 network switch can be applied. In one embodiment, one directory server 116 also manages the converged enhanced Ethernet (CEE) MAC address to the physical port mapping. In one embodiment, Single Root I/O Virtualization (SR-MY) support may use different MAC address per virtual function (VF) of the extended NVMe controller.

Once the HSID and NSID are mapped to Ethernet MAC addresses, as illustrated in FIG. 3, the extended NVMe controller 112 uses the MAC addresses to generate the NVMoE frame as illustrated in FIG. 2. Accordingly, FIG. 3 also illustrates the first portion (e.g., the MAC addresses) of the NVMoE frame depicted in FIG. 2.

Figure 4:
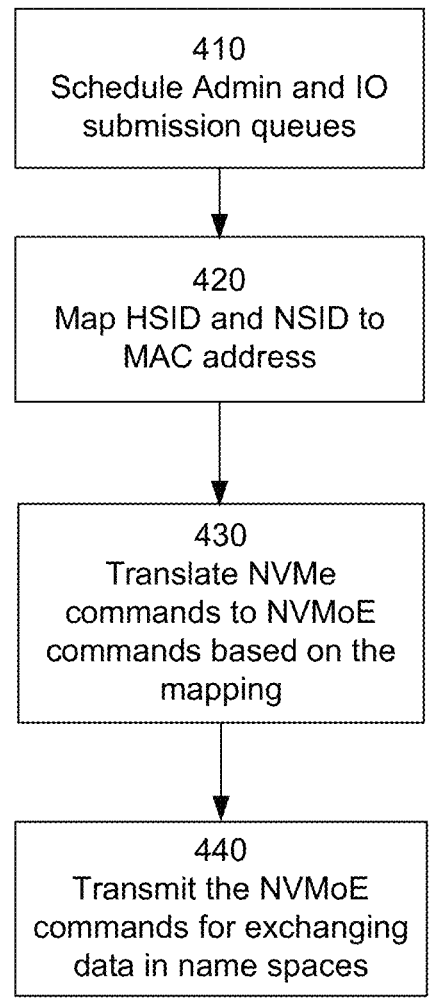
FIG. 4 is a flow diagram of a method for enabling NVMe commands to be transmitted over Ethernet.
Figure 5:
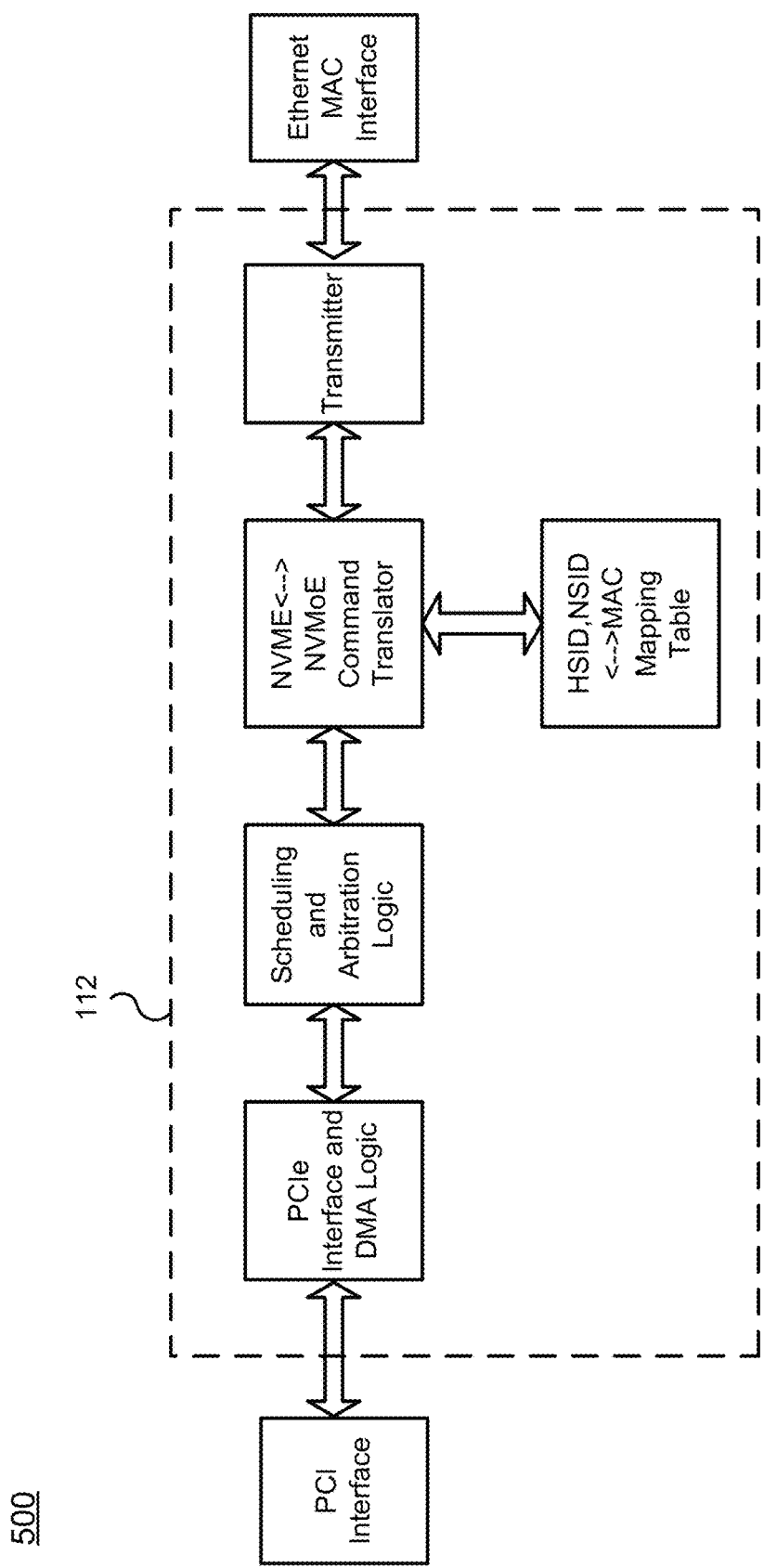
FIG. 5 is a block diagram of an extended NVMe controller.

Referring now to FIGS. 4-5, FIG. 4 illustrates a flow diagram of a method for enabling NVMe commands to be transmitted over Ethernet in accordance with one exemplary embodiment. FIG. 5 illustrates an exemplary extended NVMe controller, corresponding to one embodiment of the method depicted in FIG. 4. In the illustrated embodiment, the extended NVMe controller 112 includes a PCIe interface and DMA logic module for receiving NVMe commands and/or data from the host processor (CPU) through the PCI interface. The received NVMe commands and/or data can be directed to a local namespace for a local memory/storage or to a remote namespace for a remote memory/storage. The PCIe interface and DMA logic module is responsible for handling the PCIe read and write commands from and to the host CPU and also for scheduling the DMA write and read to and from the CPU host memory.

The extended NVMe controller 112 can also include a scheduling and arbitration logic module (or a scheduler and arbiter) that will schedule 410 administrative (Admin) and input/output (I/O) submission queues for processing and transmission of the received commands and/or data. Further, the extended NVMe controller 112 can convert the received NVMe commands to a format suitable for transmission over the external network to another NVMe controller 112 coupled to a remote namespace. For example, the extended NVMe controller 112 includes an NVMe to NVMoE command translator for mapping 420 the HSID and NSID to MAC addresses and translating 430 the NVMe commands to NVMoE commands based on the mapping. Specifically, in one exemplary embodiment, the command translator includes an NVMe to NVMoE mapper that can query a mapping table for mapping the HSID and NSID to Ethernet MAC addresses. Based on the mapping, the command translator can translate the NVMe commands to the NVMoE commands.

The extended NVMe controller 112 further includes a transmitter that transmits 440 the NVMoE commands to another extended NVMe controller 112 coupled to the network for exchanging data in the remote namespace coupled to the other controller 112. The transmitter will transmit the NVMoE commands over the Ethernet via the Ethernet MAC interface based on the mapped Ethernet MAC addresses.

Those skilled in the art will appreciate that the proposed extended NVMe controller 112 is scalable. The extended NVMe controller 112 provides remote access to SSDs over the Ethernet with reduced latency.

Figure 6:
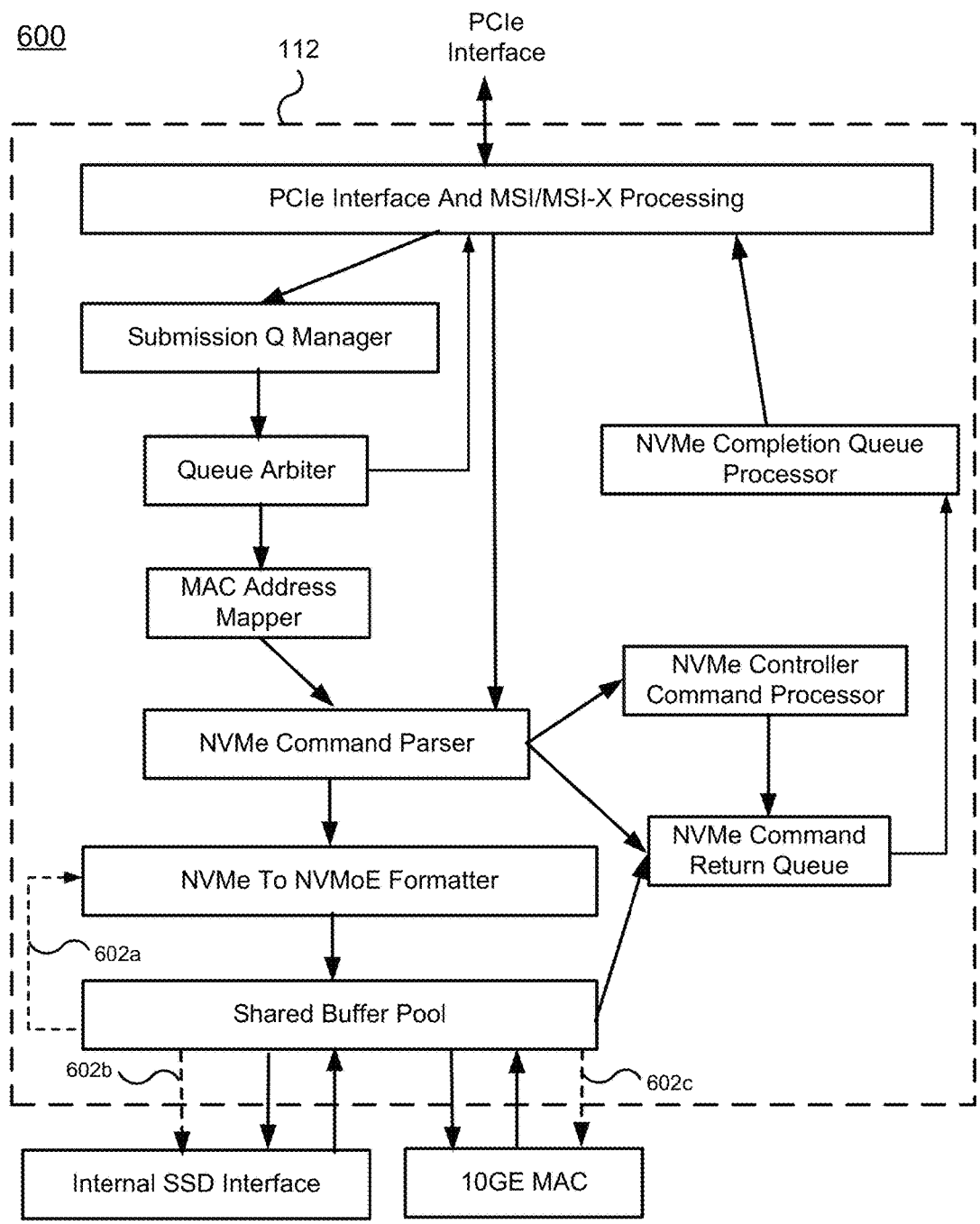
FIG. 6 is a block diagram of detailed structure of the extended NVMe controller, as depicted in FIG. 5.

FIG. 6 illustrates a detailed structure of the extended NVMe controller in accordance with one exemplary embodiment. In the illustrated embodiment, the extended NVMe controller 112 includes a PCIE interface and Message Signaled Interrupts (MSI)/MSI-X processing module for handling command and/or data communication with the PCIe interface. The extended NVMe controller 112 also includes a submission Q manager and a queue arbiter that manage the submission queues. The queue arbiter can also read physical region page (PRP) or scatter gather list (SGL) data from the PCIe interface and MSI/MSI-X processing module. The extended NVMe controller 112 includes a MAC address mapper for mapping the HSID and NSID to MAC addresses. Further, the extended NVMe controller 112 includes an NVMe command parser that parses NVMe commands received from the PCIe interface, and an NVMe-to-NVMoE formatter that formats the NVMe commands to generate NVMoE commands based on the mapped MAC addresses. The extended NVMe controller 112 can also include a shared buffer pool to buffer the NVMoE commands. From the shared buffer pool, the NVMoE commands can then be sent out through an internal SSD interface and Ethernet Media Access Controller (e.g., 10GE MAC or 40GE MAC). The shared buffer pool can provide flow control, as depicted using dashed lines 602a, 602b, 602c, on command and/or data flows from the NVMe-to-NVMoE formatter to the internal SSD interface and 10GE MAC. The extended NVMe controller 112 also includes an NVMe completion queue processor and NVMe controller command processor that cooperate with the NVMe command parser and the shared buffer pool to buffer and process NVMe command return queues received from the internal SSD interface and the Ethernet MAC interface.

Figure 7:
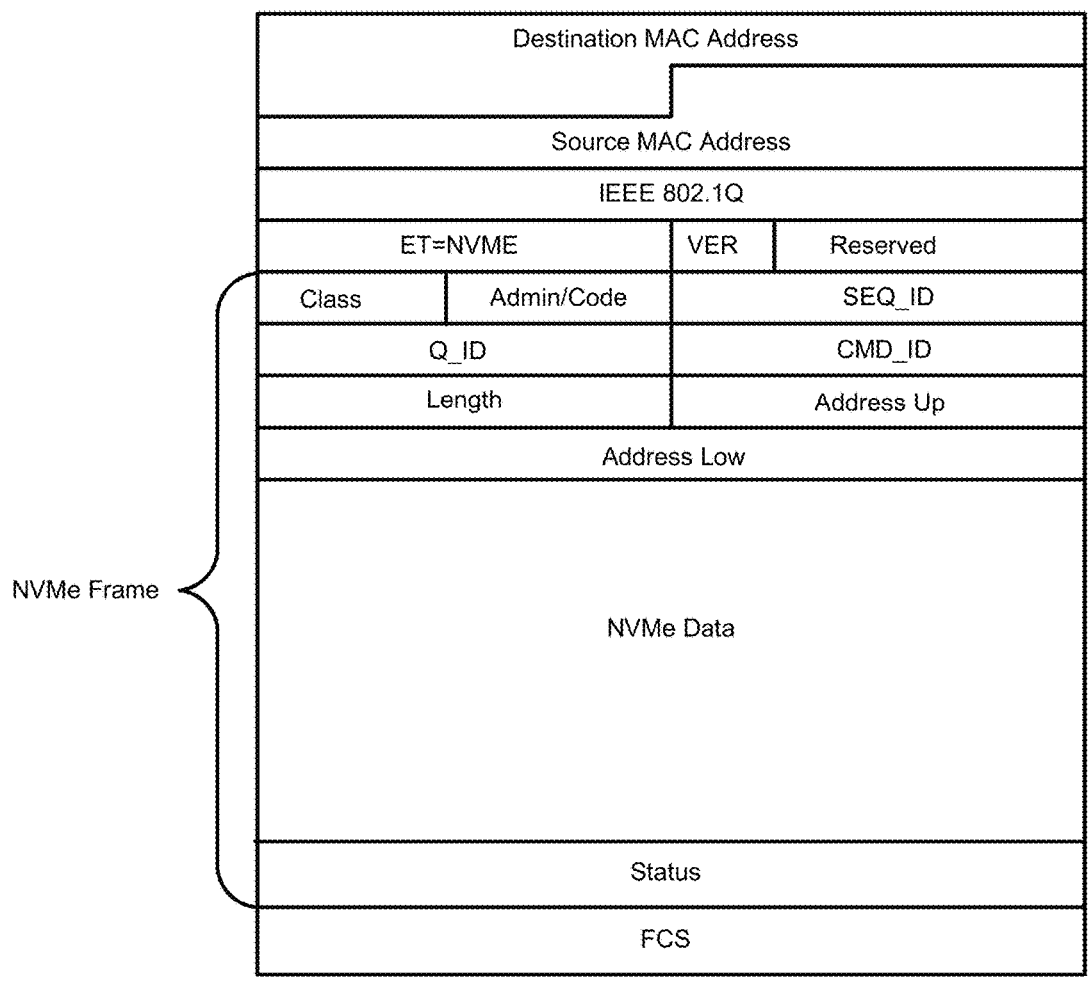
FIG. 7 is a diagram of one embodiment of an NVMoE frame.

FIG. 7 illustrates a structure of the NVMoE frame 700 used by the extended NVMe controller 112 to specify NVMoE commands, in accordance with one exemplary embodiment. Generally, the illustrated NVMoE frame 700 has the same structure as that defined in FIG. 2. However, the NVMoE frame 700, illustrated in FIG. 7, includes a detailed structure of the NVMe frame as one part of the NVMoE frame. The NVMe frame includes a 7-bit class value that defines the type of the frame data of the NVMoE frame data; an Admin/IO bit, where 0 indicates that this is an Admin command and 1 indicates that this is an I/O command; a command code as defined in NVMe specification; SEQ ID[15:0], 16 bits of the sequence tag that define the order of the issued commands in the NVMe I/O command and are used to identify the sequence of the sub-commands in the entire I/O command; Q_ID[15:0], 16 bits of queue ID that identify the submission queue from the initiator; CMD ID[15:0], 16 bits of command ID that identify the command in the submission queue; LENGTH [15:0], 16 bits of length information that define the size of the command; Address Up and Address Low[47:0], 48 bits of address that point to the logical block address or physical memory address in the NVMe storage device in DWORD; NVMe data describing the NVMe command; and Status[31:0], 32 bits of status field that indicate if the data includes any error or reportable warning message.

Note the NVMe overhead data amounts to less than 1% of the transmitted data when the sector size is 4096 byte or bigger.

Figure 8:
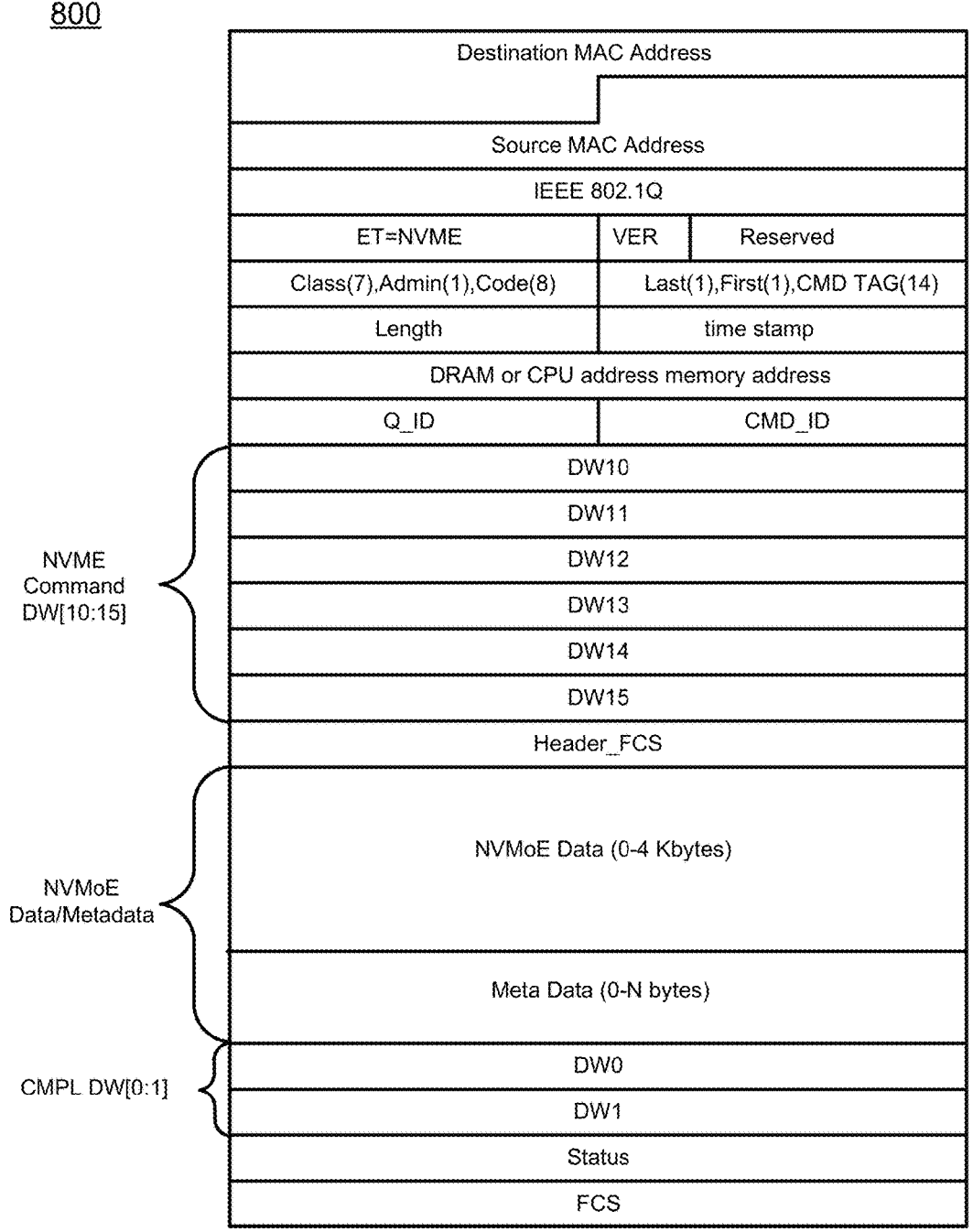
FIG. 8 is a diagram of another embodiment of an NVMoE frame.

FIG. 8 is a diagram of another embodiment of an NVMoE frame 800. Compared with the NVMoE frame 700 shown in FIG. 7, the NVMoE frame 800 additionally includes a time stamp that describes 16 bits of time stamp information used to measure latency; NVME command DW[10:15] that can be passed through NVMoE command frame; header FCS describing the CRC value generated over the NVMoE header; metadata; and completion Double Word (CMPL DWord, or CMPL DW), two DWs for completion as defined in NVMe specification.

Figure 9:
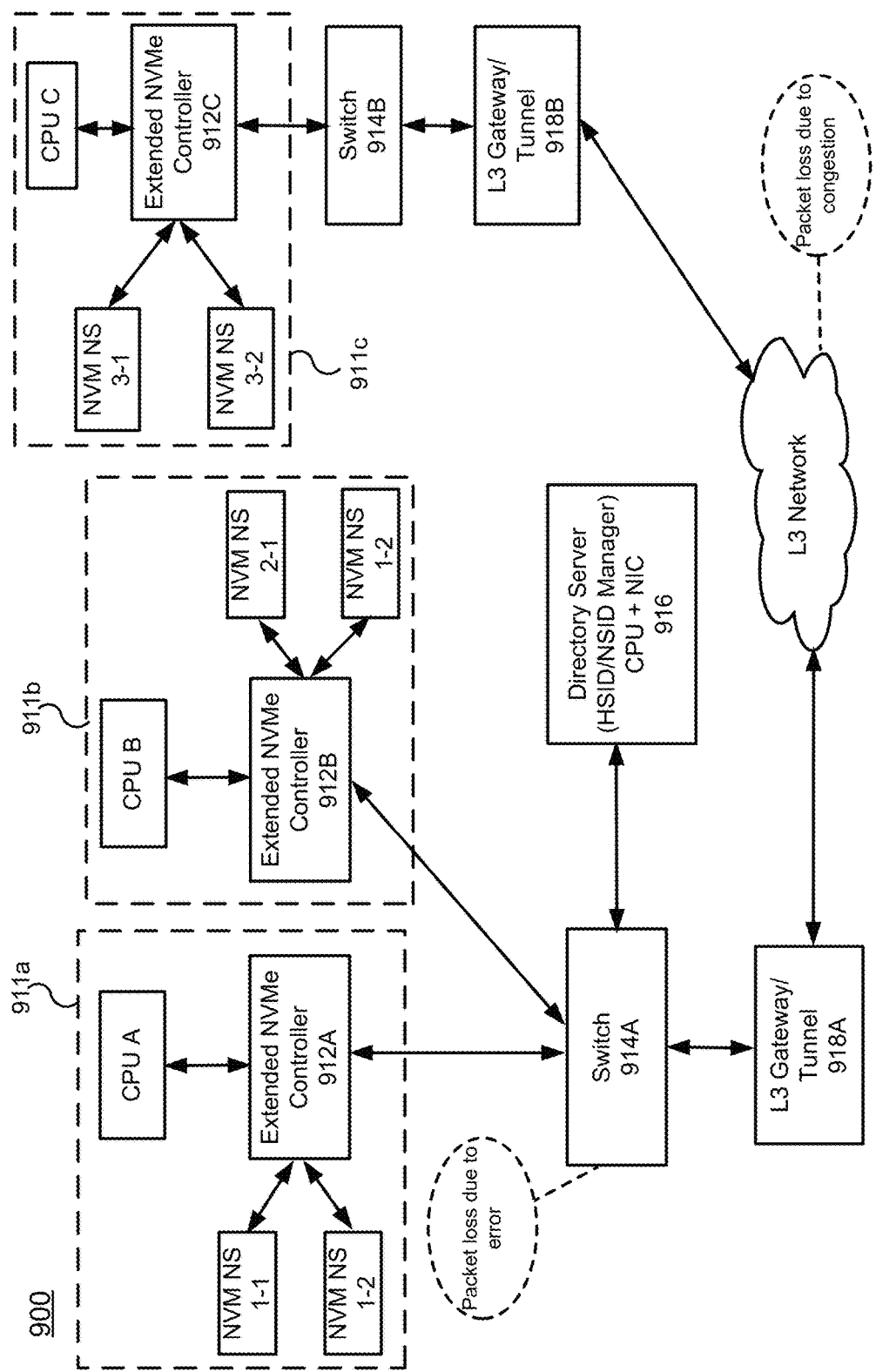
FIG. 9 is a block diagram of an extended NVMe storage system over L3 network.

FIG. 9 illustrates an extended NVMe storage system over L3 network, in accordance with one exemplary embodiment. In the illustrated exemplary embodiment, the system 900 includes similar components as those of the system 100 shown in FIG. 1. For example, the system 900 includes NVMe storage nodes 911a, 911b, 911c (also referred to individually or collectively as 911) that each include an extended NVMe controller 912A, 912B, 912C (also referred to individually or collectively as 912). In one embodiment, the extended NVMe controller 912 has similar functionalities as the extended NVMe controller 112 shown in FIG. 1. For example, the extended NVMe controller 912 can translate NVMe commands into the NVMoE format.

In one embodiment, different from the extended NVMe controller 112, the extended NVMe controller 912 further enables the NVMoE format of frame to travel over L3 networks through gateway/tunnels 918A, 918B (also referred to individually or collectively as 918) such as Stateless Transport Tunnel (STT), Virtual Extensible LAN (VXLAN) or Network Virtualization using Generic Routing Encapsulation (NVGRE). For example, the extended NVMe controller 912 can encapsulate the STT or VXLAN or NVGRE as L3 packet headers and add the L3 packet headers to the NVMoE frame. In one embodiment, in order to support a smaller MTU size such as 1.5 Kbytes, the gateway/tunnel (function) 918 may segment the original NVMoE frame before sending and reassemble the segments into the original NVMoE frame when receiving the segments of the original frame.

FIG. 9 also shows a retry mechanism for a reliable transmission of an I/O command. Although the Converged Enhanced Ethernet Frame is lossless, it is possible that some packet drop happens due to the data corruption or other errors in the Ethernet switch 914A, 914B. Similarly, the loss of the packet data may also occur in the L3 Ethernet network such as due to the traffic congestion of the L3 network. To recover from the loss of transmitted NVMe command data, the extended NVMe storage system 900 can incorporate different types of retry mechanisms. For example, the extended NVMe storage system 900 can implement a hardware-based retry mechanism so that, if a specific I/O command is not coming back, the system 900 can resend the I/O command due to a timeout. The extended NVMe controller 912 assigns a timer for each NVMoE command, and when the extended NVMe controller 912 issues the NVMoE command to the Ethernet interface for transmission, the timer starts running. Accordingly, if the timer is timed out and a corresponding NVMoE command has not come back, it is indicated that the issued NVMoE command has been lost in the network, and the extended NVMe controller 912 thus reissues an NVMoE command for transmission. In this way, the extended NVMe storage system 900 can recover from an NVMoE command loss.

In addition, the system 900 can support a software-based retry mechanism at the NVMe level. The software NVMe driver includes a timer for each issued command. Once a specific NVMe command has not returned when the timer is time out, the software NVMe driver will abort the original NVMe command and resend a new NVMe command.

Figure 10:
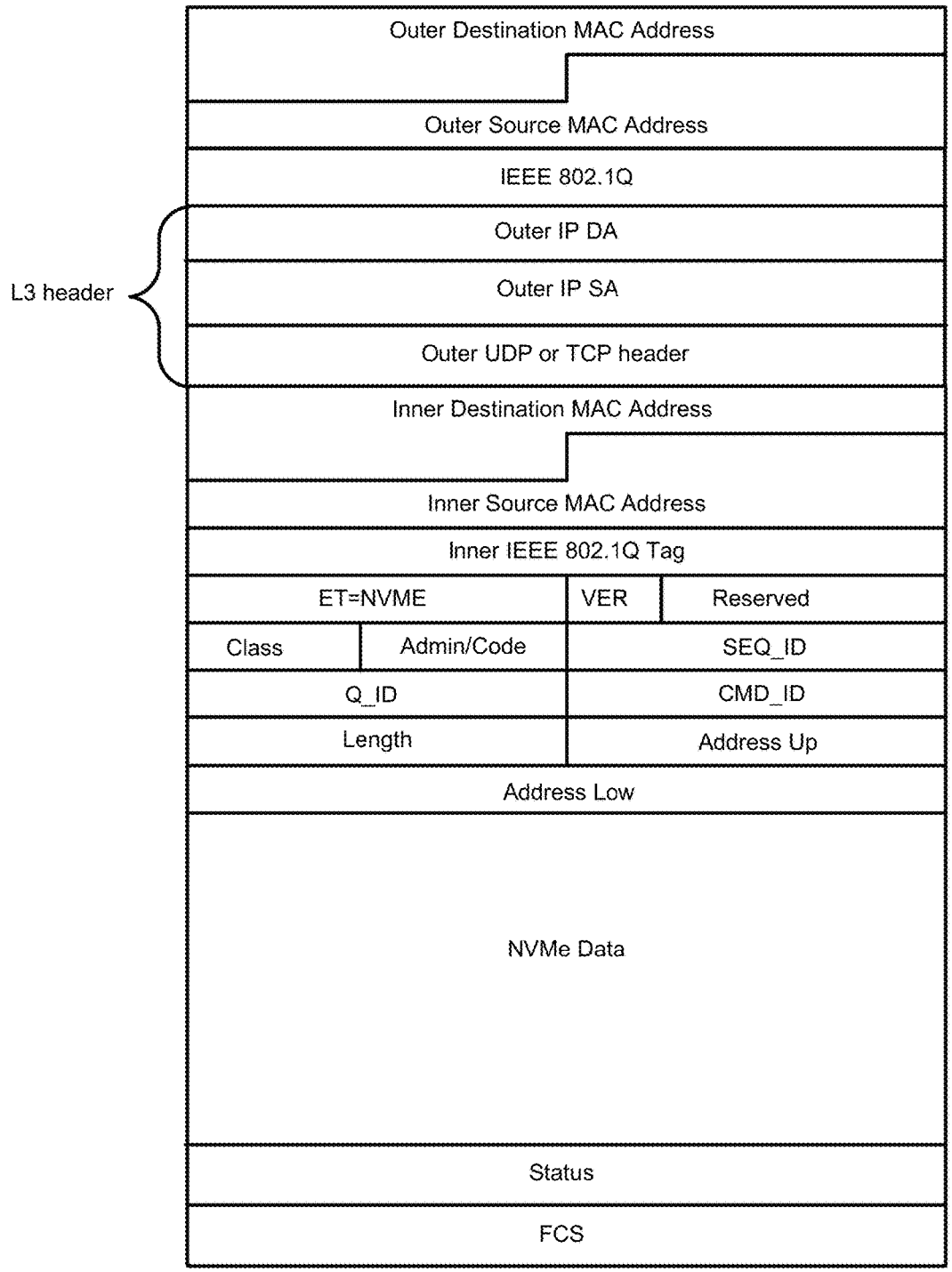
FIG. 10 is a diagram of an NVMoE frame suitable for transmission over L3 network.

Referring now to FIG. 10, illustrated is an NVMoE frame 1000 that is used by the NVMe storage system 900, in accordance with one exemplary embodiment. The NVMoE frame 1000 can travel over L3 networks through gateway/tunnel 918 such as STT, VXLAN or NVGRE. As mentioned above, to enable the NVMoE frame to travel over L3 networks, the extended NVMe controller 912 adds the encapsulation of STT or VXLAN or NVGRE to the NVMoE frame 1000. For example, in the illustrated embodiment, the NVMoE frame 1000 has an L3 packet header inserted into the frame.

Figure 11A:
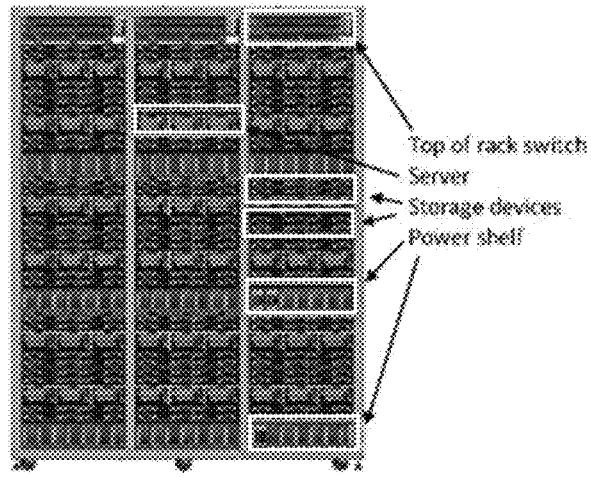
FIGS. 11A-B are diagrams illustrating an application model of the extended NVMe storage network as a server rack.
Figure 11B:
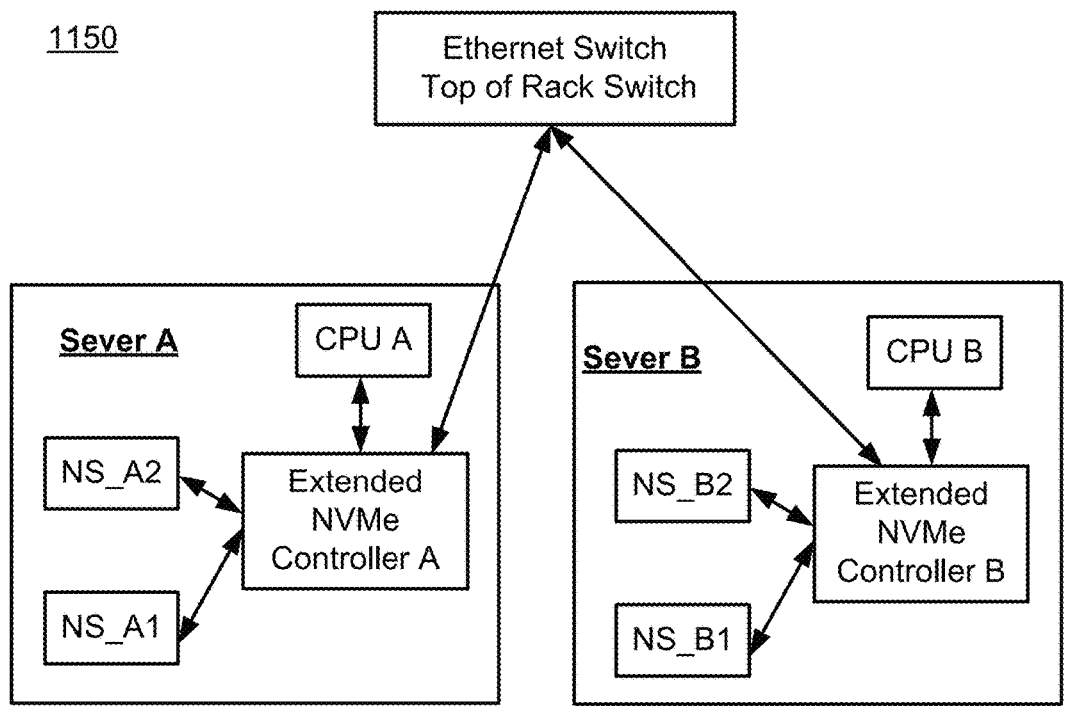

FIGS. 11A-B illustrate an application model of the extended NVMe storage network as a server rack, where extended NVMe controllers communicating via Ethernet switch. The illustrated application model is a server rack and top-of-rack switch system, where the NVMe storage nodes may include servers in the server rack and the external network may include the top-of-rack switch. In the illustrated embodiment, CPU A of server A can access name spaces, NS_B1 and NS_B2, in server B, via the extended NVMe controllers that can send and receive data over the switch. The proposed extended NVMe controllers provide advantages in terms of reduced access latency.

The extended NVMe controllers along with the SSD namespaces are installed in the PCIe slot of the server, the Ethernet connector is connected to the top of rack switch through the Ethernet cable. In this case, the server can share the SSD namespaces through the NVMoE protocol as described by the exemplary embodiment.

Figure 12A:
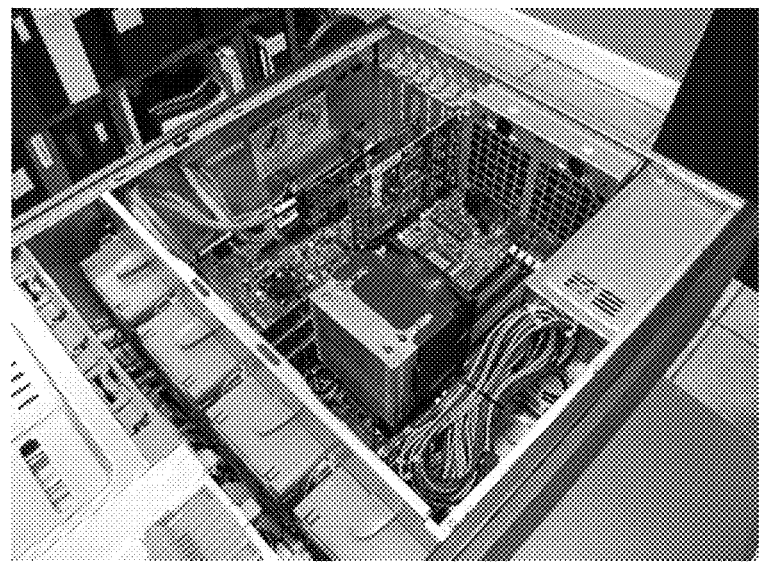
FIGS. 12A-B are diagrams illustrating an application model of the extended NVMe storage network as a single server.
Figure 12B:
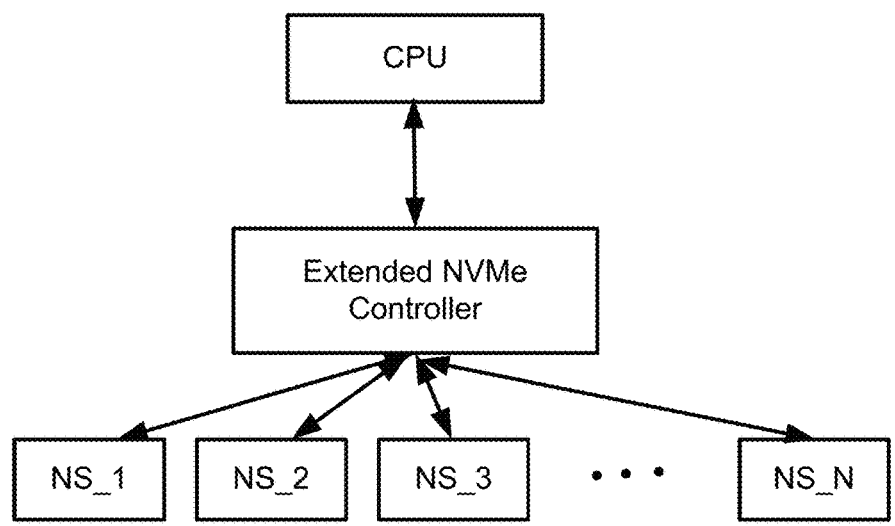

FIGS. 12A-B illustrate an application model of the extended NVMe storage network as a single server system, in accordance with one exemplary embodiment. In the exemplary embodiment, the single server system includes a single host (CPU) and multiple NVMe storage nodes that each includes a dedicated extended NVMe controller and a dedicated local non-volatile memory. The extended NVMe controller can act as a host bus adapter (HBA). There are multiple interfaces coming out of the extended NVMe controller. The extended NVMe controller can then connect each interface to an SSD namespace. This way, the host (CPU) is able to access the SSD namespace with low latency-lower latency than the traditional SAS/SATA interfaces. FIGS. 12A-B also show the HBA initiator and devices.

Figure 13:
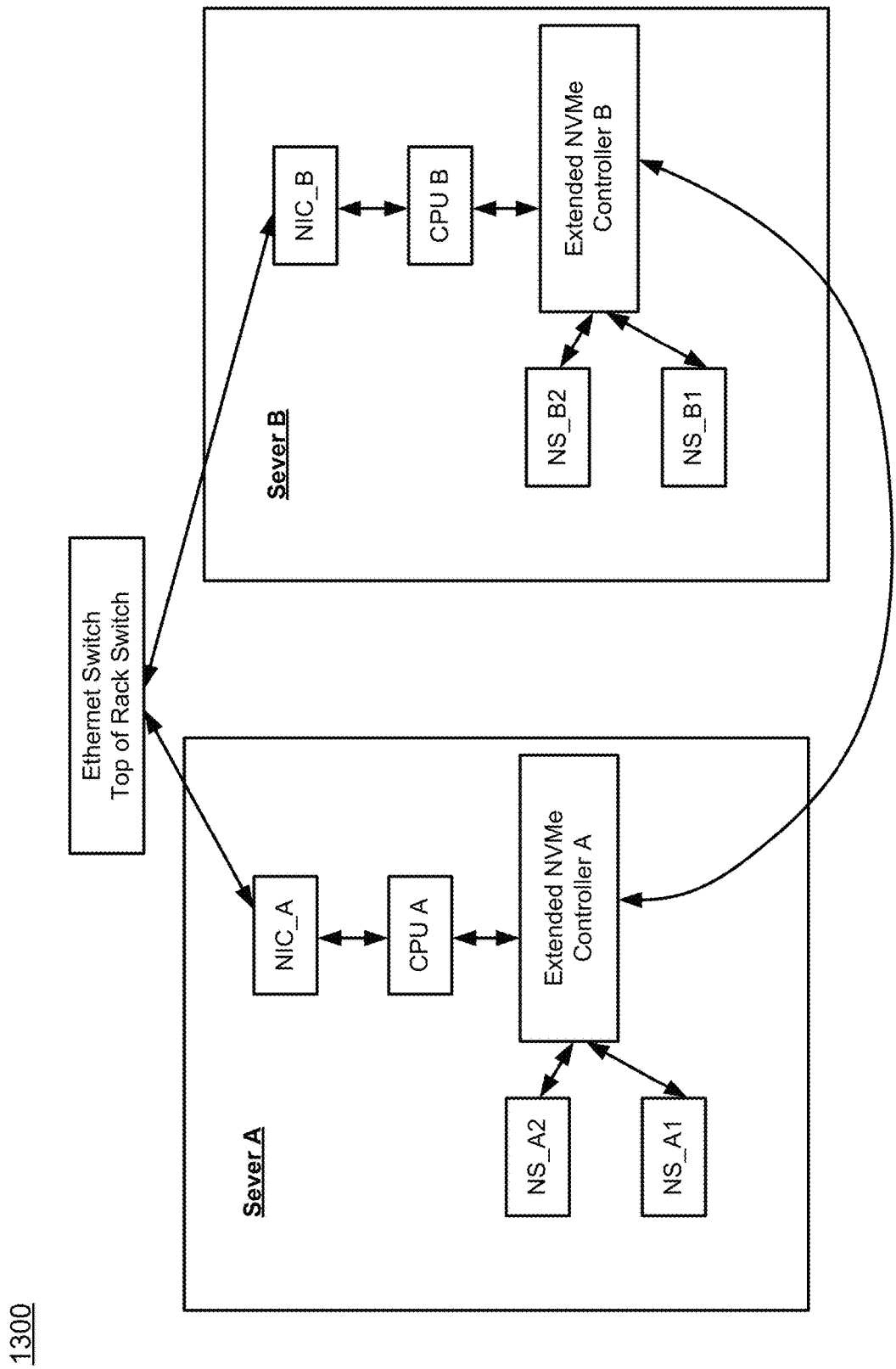
FIG. 13 is a diagram illustrating an application model of the extended NVMe storage network as a dual server system.

FIG. 13 illustrates an application model of the extended NVMe storage network as a high availability dual server system 1300, in accordance with one exemplary embodiment. In the illustrated dual server system 1300, the extended NVMe controllers, along with the SSD namespaces, are installed in the PCIe slot of the servers (e.g., server A, server B). Each server includes a host processor (CPU). The Ethernet connector is used to connect the NVMe controllers in the two servers together. In this case, the server A and the server B can work in Active-Active or Active-Standby mode sharing all the namespaces residing in server A and server B. In case the CPU of one server fails, the other server's CPU can take over. In addition, it is possible that the namespaces residing on the server B can be a mirrored copy of namespaces residing on server A and kept synchronized when namespaces on the server A are written. Accordingly, if server A fails, server B can take over without loss of data.

Note that the name spaces NS_A1, NS_A2, NS_B1 and NS_B2 are logical drives (i.e., collections of blocks of non-volatile memory). They appear as local drives to the CPU A and the CPU B respectively.

Figure 14:
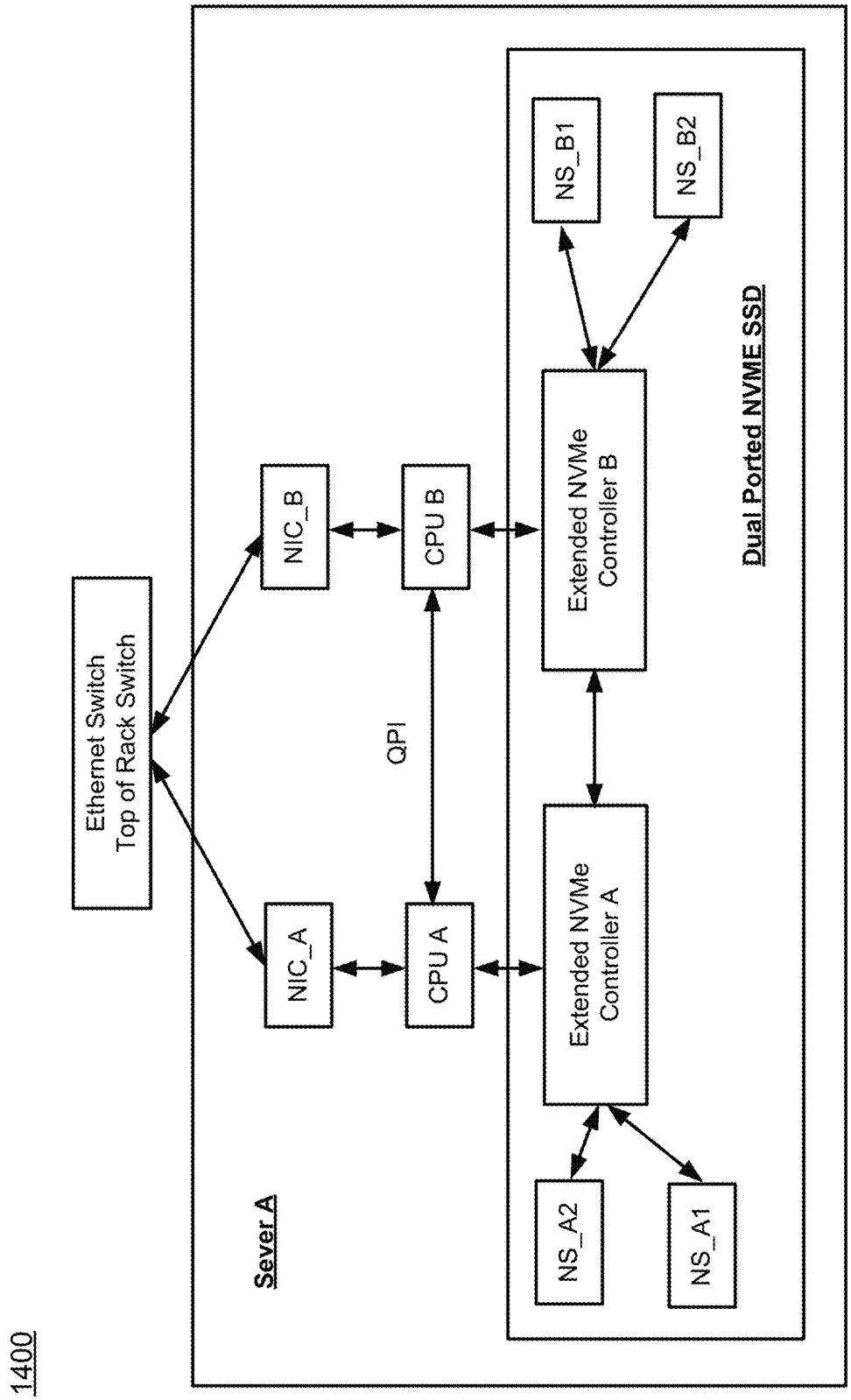
FIG. 14 is a diagram illustrating an application model of the extended NVMe storage network as a dual ported server system.

FIG. 14 is a diagram illustrating an application model of the extended NVMe storage network as a dual ported server system 1400, in accordance with one exemplary embodiment. The system 1400 can be a dual CPU single server system including two extended NVMe controllers with their local namespace controllers. The two extended NVMe controllers connect to each other through Ethernet interface. In the illustrated embodiment, the system 1400 includes two PCIe ports connected to two CPUs with one PCIe interface to each CPU. Each PCIe port connects the CUP to the extended NVMe controller. In this way, the system 1400 can support dual port PCIe SSD controller application.

Figure 15:
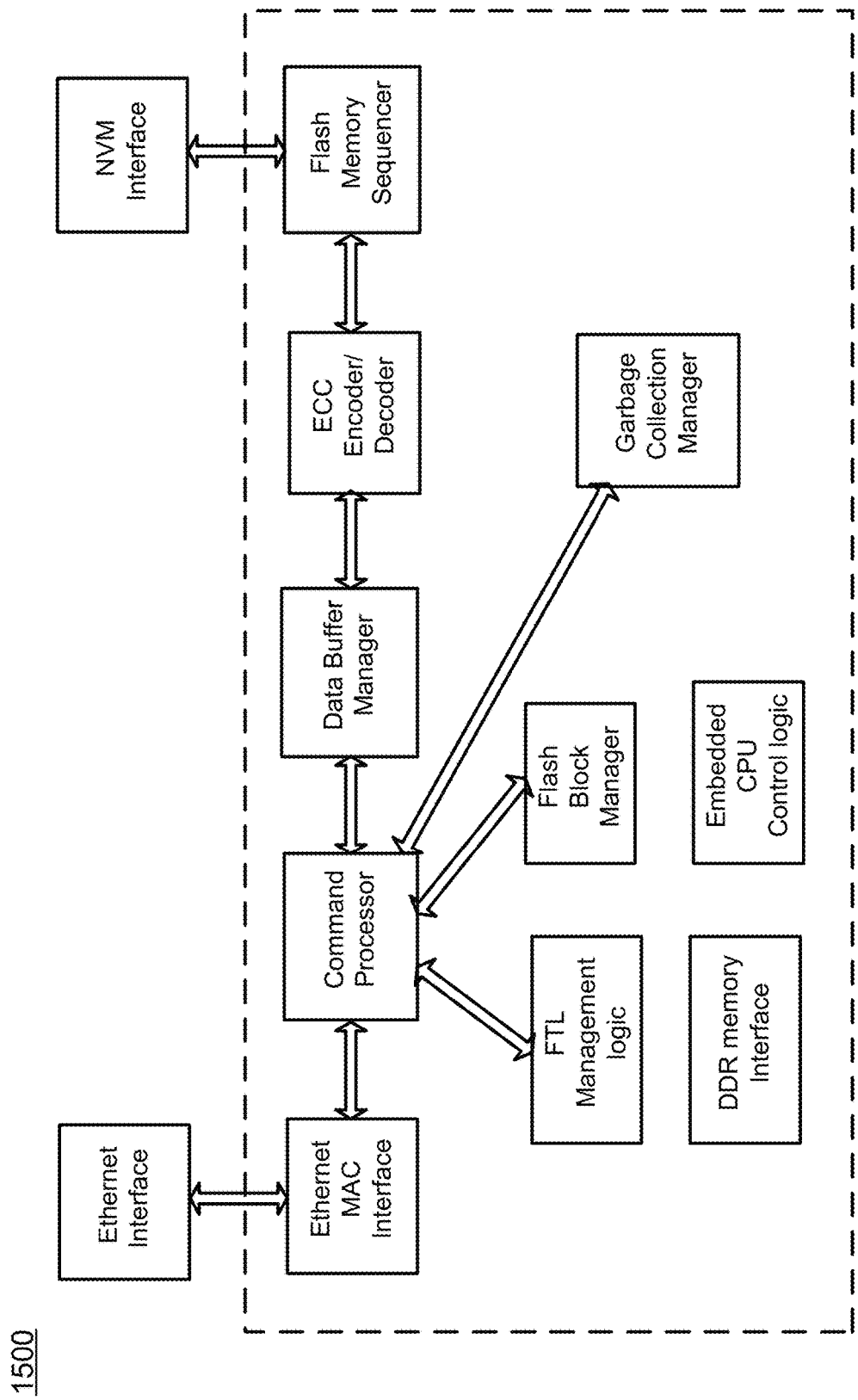
FIG. 15 is a block diagram of a name space controller.

FIG. 15 illustrates a namespace controller, in accordance with one exemplary embodiment. As shown in the exemplary embodiment, the namespace controller includes an Ethernet MAC interface, a command processor, a data buffer manager, an ECC encoder/decoder, a flash memory sequencer, a FTL management logic module, a flash block manager, and a garbage collection manager. The Ethernet MAC interface receives or sends the NVMoE frame. The command processor interprets NVMoE command frame data. The data buffer module stores the NVMoE command after the command is processed by the command processor or received from the ECC decoder. The FTL management logic module optionally converts the logical block Address to the physical page address. The Flash block manager manages the status of a block, whether it is over a certain P/E cycles or needs refreshing. The garbage collection manager manages the timing to recycle a non-volatile memory block data to get more free blocks to erase and write to. The ECC encoder/decoder can optionally add Error Correction Coding capability to correct the non-volatile memory bit errors. The Flash memory interface sequencer controls command and data interface so that data is stored and read based on the NVMoE command and the need of the garbage collection manager.

Figure 16:
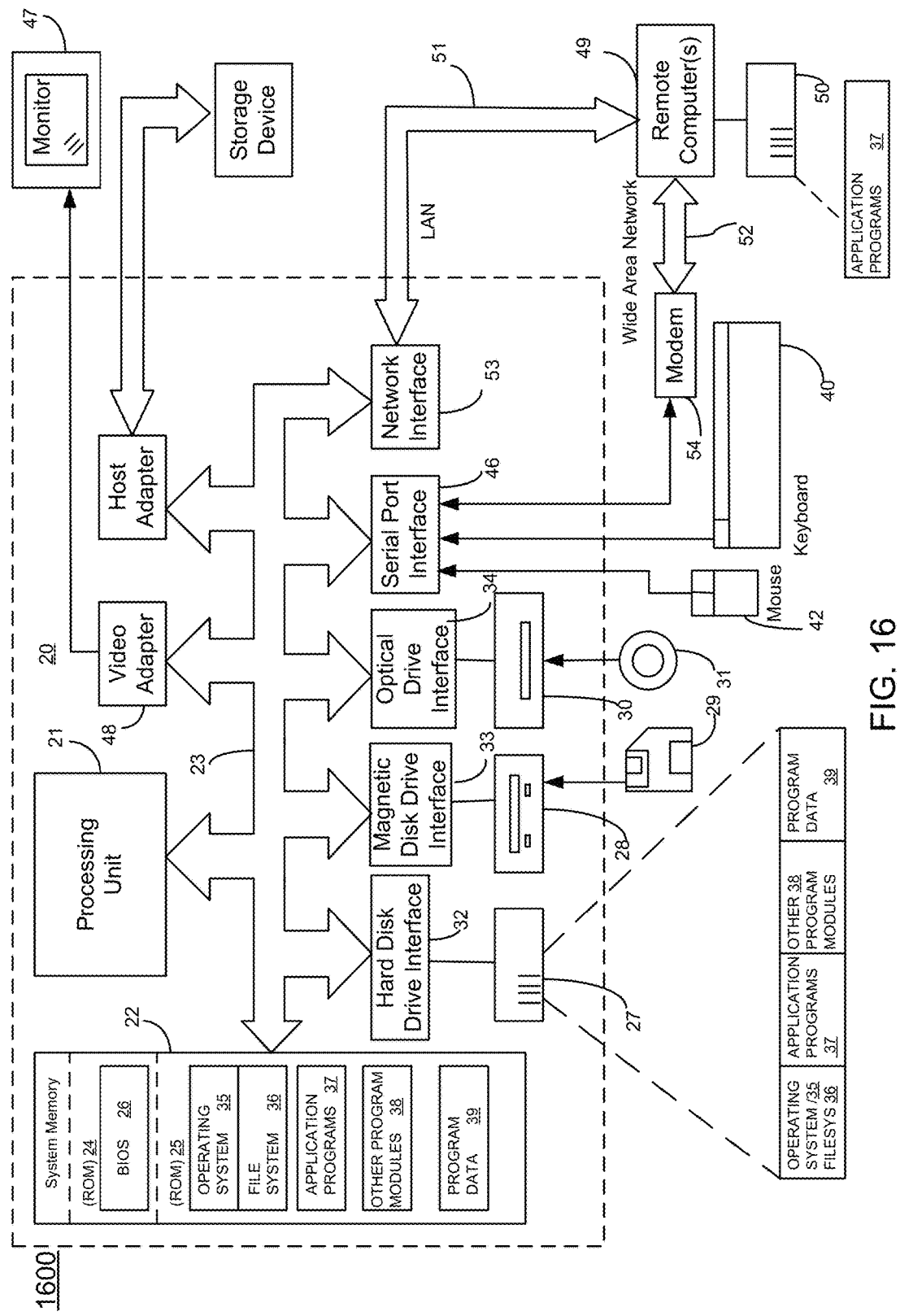
FIG. 16 is a block diagram of a schematic example of a computer or a server that can be used in the present invention.

With reference to FIG. 16, an exemplary computing system 1600 for implementing the invention is illustrated. The computing system 1600 includes a general purpose computing device (i.e., a host node) in the form of a personal computer (or a node) 20 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer/node 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), solid state drives and the like may also be used in the exemplary operating environment.

A number of program modules may be stored on the hard disk, solid state drive, magnetic disk 29, optical disk 31, ROM 24 or RAM 25, including an operating system 35 (preferably WINDOWS™). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a solid state drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI, PCIe and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local area network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations, which will be apparent to those, skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. An extended NVMe controller comprising:
   a host interface adapted to couple the extended NVMe controller to a host processor;
   a direct network interface adapted to couple the extended NVMe controller to an external Ethernet network; and
   wherein the extended NVMe controller is configured to:
   receive, from the host processor, NVMe commands directed to a remote namespace for a remote non-volatile memory coupled to the external Ethernet network;
   translate NVMe commands to NVMe over Ethernet (NVMoE) commands suitable for transmission over the external Ethernet network to a remote namespace controller for a remote namespace, the NVMe commands received from the host processer via the host interface, wherein the translation of the NVME command to NVMoE command comprises mapping a name space identifier (NSID) of the NVMe commands to an Ethernet media access control (MAC) address; and
   transmit the translated NVMe command directly over the external Ethernet network to the remote namespace controller.

2. The extended NVMe controller of claim 1, further comprising:
   a mapping table that maps one or more NISDs to one or more Ethernet MAC addresses; and
   wherein the extended NVMe controller maps the NISD of the NVMe commands to the Ethernet MAC address using the mapping table.

3. The extended NVMe controller of claim 1 further comprising a scheduler and arbiter to schedule a queue for processing the NVMe commands.

4. The extended NVMe controller of claim 1, further comprising a local memory interface adapted to couple the extended NVMe controller to a local namespace for local non-volatile memory, wherein the extended NVMe controller receives from the host processor NVMe commands directed to the local namespace and provides I/O access for the host processor to the local namespace.

5. The extended NVMe controller of claim 4, wherein the NVMe commands address the local namespace by HSID and NSID, and the extended NVMe controller accesses a directory server that manages HSIDs and NSIDs to obtain HSIDs and/or NSIDs for the local namespace.

6. The extended NVMe controller of claim 4, wherein the extended NVMe controller is coupled to a second extended NVMe controller, wherein the second extended NVMe controller is coupled to a second host processor, wherein the second extended NVMe controller is connected to the extended NVMe controller via a second direct network interface, and wherein the second extended NVMe controller is configured to mirror the local namespace of the extended NVMe controller and act as a standby if the extended NVMe controller fails.

7. The extended NVMe controller of claim 5, wherein the extended NVMe controller requests one or more HSIDs and one or more NSIDs from the directory server, and receives HSIDs and NSIDs that are not repeated in the external Ethernet network.

8. The extended NVMe controller of claim 1, further comprising a shared buffer pool to provide flow control on command and data flows from the direct network interface.

9. The extended NVMe controller of claim 1, wherein the external Ethernet network includes a layer 3 network, and wherein the extended NVMe controller is further configured to encapsulate the NVMoE commands within layer 3 packet headers for transmission over the layer 3 network.

10. A method for accessing a remote name space, the method comprising:
    receiving, at an extended NVMe controller from a host processor, NVMe commands directed to a remote namespace for a remote non-volatile memory coupled to an external network, the extended NVMe controller also coupled to the external network, the extended NVMe controller coupled to the host processor via a host interface;
    translating, at the extended NVMe controller, the received NVMe commands to NVMe over Ethernet (NVMoE) commands suitable for transmission over the external Ethernet network to a remote namespace controller for a remote namespace, wherein the translation of the NVME command to NVMoE command comprises mapping a name space identifier (NSID) of the NVMe commands to an Ethernet media access control (MAC) address; and
    transmitting, at the extended NVMe controller, the translated NVMe command directly over the external Ethernet network to the remote namespace controller.

11. The method of claim 10, wherein the extended NVMe controller further comprises:
    a mapping table that maps one or more NISDs to one or more Ethernet MAC addresses; and
    wherein the extended NVMe controller maps the NISD of the NVMe commands to the Ethernet MAC address using the mapping table.

12. The method of claim 10, further comprising:
    processing the received NVMe commands using a command scheduler and a command arbiter.

13. The method of claim 10, further comprising:
    receiving, by the extended NVMe controller from the host processor, NVMe commands directed to a local namespace;
    providing, by the extended NVMe controller, I/O access for the host processor to the local namespace, wherein the extended NVMe controller comprises a local memory interface adapted to couple the extended NVMe controller to the local namespace for local non-volatile memory.

14. The method of claim 13, wherein the NVMe commands address the local namespace by HSID and NSID, the method further comprising:

accessing a directory server that manages HSIDs and NSIDs to obtain HSIDs and/or NSIDs for the local namespace.

15. The method of claim 13, wherein the extended NVMe controller is coupled to a second extended NVMe controller, wherein the second extended NVMe controller is coupled to a second host processor, wherein the second extended NVMe controller is connected to the extended NVMe controller via a second direct network interface, and wherein the second extended NVMe controller is configured to mirror the local namespace of the extended NVMe controller and act as a standby if the extended NVMe controller fails.

16. The method of claim 14, further comprising:
requesting, by the extended NVMe controller, one or more HSIDs and one or more NSIDs from the directory server; and
receiving HSIDs and NSIDs that are not repeated in the external Ethernet network.

17. The method of claim 10, further comprising:
providing flow control on command and data flows from the direct network interface using a shared buffer pool.

18. The method of claim 10, wherein the external Ethernet network includes a layer 3 network, the method further comprising:
encapsulating, by the extended NVMe controller, the NVMoE commands within layer 3 packet headers for transmission over the layer 3 network.

* * * * *